United States Patent [19]

Goswami

[11] Patent Number: 4,745,140

[45] Date of Patent: May 17, 1988

[54] AQUEOUS ADHESIVE COMPOSITION CONTAINING N-VINYL LACTAM RESIN, TACKIFIER, AND ETHYLENE/VINYL ACETATE EMULSION STABILIZER

[75] Inventor: Jagadish C. Goswami, New City, N.Y.

[73] Assignee: Chesebrough-Pond's Inc., Greenwich, Conn.

[21] Appl. No.: 25,425

[22] Filed: Mar. 13, 1987

[51] Int. Cl.$^4$ .................. C08L 39/00; C08L 39/06
[52] U.S. Cl. ....,.............................. 523/334; 524/271; 524/516
[58] Field of Search ............... 524/271, 516; 523/334

[56] References Cited

U.S. PATENT DOCUMENTS

| | | |
|---|---|---|
| 3,891,584 | 6/1975 | Ray-Chaudhuri et al. ......... 524/272 |
| 4,296,017 | 10/1981 | Weissgerber et al. ............. 428/355 |
| 4,331,576 | 5/1982 | Colon et al. ...................... 524/271 |
| 4,345,349 | 8/1982 | Flanagan .......................... 524/271 |
| 4,425,405 | 1/1984 | Murakami et al. ................. 428/331 |
| 4,472,537 | 9/1984 | Johnson et al. ................... 524/272 |

FOREIGN PATENT DOCUMENTS

| | | |
|---|---|---|
| 0230008 | 11/1985 | German Democratic Rep. ........................... 524/271 |
| 0048736 | 5/1974 | Japan ................... 524/271 |
| 0108174 | 7/1982 | Japan ................... 524/271 |

OTHER PUBLICATIONS

Japio 82-108174 Jul. 1982 Aikakogyo, Ono.
Derwent Abs 81-76550D/42 9-81 Nippon Synth J56110764.

Primary Examiner—Herbert J. Lilling
Attorney, Agent, or Firm—Melvin H. Kurtz

[57] ABSTRACT

Aqueous-based adhesive compositions having good adhesion to a non-polar polymeric surface and to cellulosic materials comprise a dispersion of an adhesive comprising an N-vinyl lactam polymeric resin, a tackifier for such adhesive, and an effective amount of an ethylene/vinyl acetate copolymer emulsion stabilizer for the resin and tackifier. Preferred N-vinyl lactam polymeric resins are vinyl pyrrolidone/vinyl acetate copolymers and a preferred class of tackifier are the rosin ester tackifiers.

7 Claims, No Drawings

AQUEOUS ADHESIVE COMPOSITION CONTAINING N-VINYL LACTAM RESIN, TACKIFIER, AND ETHYLENE/VINYL ACETATE EMULSION STABILIZER

BACKGROUND OF THE PRESENT INVENTION

1. Field of the Present Invention

The present invention is an aqueous adhesive composition comprising an N-vinyl lactam polymeric resin (e.g., a copolymer of the N-vinyl lactam and an ethylenically unsaturated monomer), a tackifier for such resin, and an effective amount of an emulsion stabilizer for the resin and tackifier to aid in cleaning metallic machine parts to which adhesive residue might become attached.

2. Description of Related Development

In copending U.S. Ser. No. 825,417, filed Feb. 3, 1986, entitled "Liquid Dispenser with Absorbent Applicator Tip", a dispensing apparatus for liquids is described which comprises a generally tubular container adapted to hole the liquid to be dispensed, the container comprising a reservoir section, a more narrow capillary section, and a frangible tip portion attached to the capillary section. The tubular container is described as being covered at its tip portion, capillary section and adjacent container reservoir section by an absorbent swab member. In a preferred commercial embodiment, the tubular container is formed of a non-polar polymeric material, such as polypropylene, whereas the absorbent swab member is formed of a cellulosic material, such as cotton. In order to manufacture substantial quantities of such dispensers, a high-speed manufacturing procedure is needed which utilizes machinery having metallic parts. In order to ensure the adequate bonding of the absorbent swab member to the non-polar polymeric surface of the dispenser, an adhesive having certain characteristics is needed, especially when one considers that it is also desirable that the adhesive composition not unduly foul the metallic surfaces of the machinery used in such a manufacturing process. Briefly stated, the adhesive needs to have sufficient wet-tack to ensure the secure attachment of the absorbent swab on the tubular polymer body. The adhesive must have good bonding characteristics to both non-polar polymeric surfaces, as well as cellulosic material in order to be effective. The adhesive must also be one which does not unduly foul metallic surfaces on the machinery in such a way as to render their cleaning difficult. Also, in order not to foul the manufacturing environment, it is preferable that the adhesive be an aqueous dispersion system.

The foregoing characteristics, which have been described for an adhesive for the aforementioned type of dispenser, are also applicable to other types of articles where a cellulosic material needs to be bonded to a non-polar polymeric surface. For example, it is known to manufacture swabs using an applicator stick formed of a plastic, such as polypropylene, with the applicator swab being cotton. The adhesive which is the subject of the present invention would also find utility in the fabrication of such swab products on appropriate swab-forming machinery.

SUMMARY OF THE PRESENT INVENTION

The present invention is an adhesive composition dispersed in water (or a water/alcohol mixture) having good adhesion to a non-polar polymeric surface and to cellulosic materials. The adhesive system comprises: (a) an N-vinyl lactam polymeric resin (e.g., a copolymer of the N-vinyl lactam and an ethylenically unsaturated monomer); (b) an aqueous dispersion or emulsion of a tackifier for such resin; and (c) an effective amount of an ethylene/vinyl acetate copolymer emulsion stabilizer for the resin (a) and tackifier (b).

During development of the aforementioned adhesive composition, it was found that the mere combination of an N-vinyl lactam polymeric resin copolymer and tackifier (e.g., a rosin ester tackifier) in an appropriate dispersion medium (e.g., water) resulted flocculation or coalescence of the formulation. Without the presence of the ethylene/vinyl acetate emulsion stabilizer to be described below, the cleaning of machine parts was difficult as shown in Example 2 herein. Hence, a need existed for an improved adhesive which was more compatible and which did not have the undesired adhesive residue problem manifested by the adhesive of Example 2.

DETAILED DESCRIPTION OF THE PRESENT INVENTION

The present involves an adhesive composition dispersed in an aqueous phase (e.g., a water/alcohol phase). Preferably, the water or water/alcohol mixture can be present at anywhere from about 25% to about 60% by weight of the entire adhesive composition. Generally, miscible mixtures of water and alcohol will be employed since the solid components of the adhesives of the present invention are generally commercially available as either dispersed in water or as solvent-based (e.g., alcohol-based) products. Water or water/alcohol dispersing media are preferable to the use of organic solvent media which may have odor or toxicity problems connected with their usage, for example.

The first major component of the adhesive composition of the present invention is an N-vinyl lactam polymeric resin. Such adhesives are well known to persons of ordinary skill in the art, as shown in U.S. Pat. No. 4,337,325 at Col. 2, line 41 to Col. 3, line 2, which is incorporated herein by reference. Suitable N-vinyl lactam polymers or copolymers include the vinyl pyrrolidone and vinyl caprolactam polymers and copolymers. Copolymers with ethylenically unsaturated monomers are preferred since they are not water soluble and are also not sensitive to moisture in the air which would tend to compromise their tackiness. A preferred N-vinyl lactam species is 1-vinyl 2-pyrrolidone. Advantageously, the copolymers of such polymeric entities can be employed such as those in which vinyl acetate or the alkyl acrylates and methacrylates having from 1 to 14 carbon atoms in their alkyl group are used. A preferred copolymer is vinyl acetate. The polymers and copolymers that can be used can have molecular weights of from 10,000 to 1,000,000 or more and a glass transition temperature of from about 20° C. to about 150° C. It has been found that a suitable vinyl pyrrolidone/vinyl acetate copolymer resin is E-335 from GAF, which is a 30% vinyl pyrrolidone/70% vinyl acetate copolymer in ethanol. Generally speaking, the amount of N-vinyl lactam polymeric resin which is used in the compositions of the present invention can range anywhere from about 10% by weight to about 30% by weight, if expressed on a solids basis in regard to the entire composition (solids plus solvent). If expressed on a solids basis only, the amount can range from about 25% to about 50% by weight of the solids in the composition.

The second component of the present invention is an appropriate tackifier for the aforementioned N-lactam polymer resin or copolymer. Aqueous emulsions of rosin ester tackifiers have been found to be useful. Such tackifiers are well known to persons of ordinary skill in the art, and are available from a number of commercial sources. One particular type, which has been found to be useful, is sold under the trademark AQUATAC from Sylvachem Co. Generally speaking, the amount of tackifier can range anywhere from about 10% to about 30%, by weight of the entire composition (solids plus solvent). If the amount of such component is expressed as a percentage of the solids content in the adhesive compositions of the present invention, the amount can range from about 25% by weight to about 50% by weight.

In order to ensure the emulsion stability and compatibility of the aforementioned N-lactam polymeric resin component and the tackifier (e.g., a rosin ester tackifier), the present invention contemplates the use of an effective amount for such compatibilization of an ethylene/vinyl acetate copolymer e.g., in the form of an aqueous emulsion. Such aqueous emulsions of ethylene/vinyl acetate copolymers are marketed by several companies. One which has been found to be effective is available under the designation, POLY EMULSION 371N30 from Chemical Corporation of America, East Rutherford, N.J. General speaking, the amount of this component that is present in the compositions of the present invention can range from about 5% to about 15% by weight of the adhesive compositions of the present invention if the amount of solids and solvent are both considered as the basis. If only the solid components are considered as the basis, the amount which can be used can range from about 15% to about 30% by weight of the compositions of the present invention. The aqueous emulsion of ethylene/vinyl acetate polymer used herein serves as an emulsion stabilizer and compatibilizer for the N-vinyl lactam polymer solution and aqueous tackifier component, and also ensures that if the adhesive composition is applied using machinery having metal parts, the adhesive residue that might adhere to such metal parts is more easily removed than if the ethylene/vinyl acetate compatibilizing additive were not present.

The present invention is further understood by the Examples which follow, wherein Examples 1-4 and 6 are presented for comparative illustration only. One particularly preferred embodiment of the present invention is illustrated in Example 5 alone.

TEST PROCEDURE

The adhesive candidates described in the Examples which follow were applied from a standard glue wheel applicator on a CT-200 FASSBIND swab machine to hold cotton swabs to polypropylene applicator sticks. The sticks were 1/10 inch by 2⅜ inches, the glue wheels were 4½ inches in diameter by 5/16 inch in width and rotated at a rate of 35 rpm. The adhesive application rate was 250 sticks per minute.

EXAMPLE 1

The composition of this adhesive was:

| Ingredients | Wt. % |
| --- | --- |
| Poly(vinylpyrrolidone/vinyl acetate) (50% resin solution in isopropanol) | 47.1 |
| Nonyl phenol | 29.4 |
| Tall oil rosin ester (80% solids in water) | 23.4 |

Evaluation:

When applied as earlier described, there was no problem encountered in applying the adhesive to the applicator stick at varying speeds. The adhesive machined well, and there was no glue buildup on the metal doctor blades of the swab machine during the four hour length of the test. The adhesive showed initial tack so that cotton could be wrapped around the applicator stick but had limited bonding of the cotton swab material to the polypropylene applicator stick when forming the swab under pressure. There was no bond between the cotton and the polypropylene stick after the swabs were made and packed, and also no bond twenty-four hours after the swabs were produced.

The adhesive composition had a strong solvent odor. It was flammable. It was also difficult to remove from certain machine parts and the glue pot necessitating the use of paint thinner as a solvent.

EXAMPLES 2 AND 3

The following two adhesive formulations were formulated:

| Ingredients | % by Wt. |
| --- | --- |
| 2. | |
| Poly(vinylpyrrolidone/vinyl acetate) (50% in isopropanol) | 27.6 |
| Nonyl phenol | 17.2 |
| Tall oil rosin ester (55% solids in water) | 55.2 |
| 3. | |
| Carboxylated styrene-butadiene polymer (51% solids in water) | 50 |
| Glycerol ester of hydrogenated rosin (55% solids in water) | 50 |

Evaluation

Adhesive 2 processed very well, even at high speed, with no odor generation. It showed excellent initial wet tack to wrap cotton around a polypropylene applicator stick. The adhesion between the cotton and the applicator stick was excellent. A force of 8–9 kg was needed to separate the cotton from the polypropylene. However, this adhesive left undesired adhesive residue on the machine parts which were difficult to remove.

Adhesive 3 did not process too well. The cotton could be wrapped around only on one side of the sticks. The adhesion between the cotton and polypropylene applicator stick was excellent and was similar to that of Adhesive 2.

EXAMPLES 4–6

Three adhesive formulations were prepared:

| Ingredients | % Wt. |
| --- | --- |
| 4. | |
| Carboxylated styrene-butadiene polymer (50% solids in water) | 39.6 |
| Tall oil rosin ester (55% solids in water) | 59.4 |
| Polyvinyl pyrrolidone (29% solids in water) | 1.0 |
| 5. | |

| Ingredients | % Wt. |
| --- | --- |
| Poly(vinylpyrrolidone/vinyl acetate) (50% resin solution in ethanol) | 33.3 |
| Ethylene/vinyl acetate resin (30% solids in water) | 33.3 |
| Tall oil rosin ester (55% solids in water) | 33.3 |
| 6. | |
| Poly(vinylpyrrolidone/vinyl acetate) (50% solids in ethanol) | 22.5 |
| Nonyl phenol | 14.0 |
| Tall oil rosin ester (55% solids in water) | 45.0 |
| Water | 18.5 |

Evaluation

All three adhesives were evaluated as earlier described with the adhesive being applied at a machine speed of 460 sticks per minute. The speed of stick travel over the glue wheel was 920 inches per minute. The test period was for fifteen minutes for each adhesive formulation.

Adhesive 4 did not run very well on the machine. It set up very fast on the glue wheels and did not transfer cleanly to the applicator sticks. The adhesive did not have good initial tack and many of the applicator sticks did not pick up cotton when it was applied to the stick. The cleaning of this adhesive from the glue pot and from the machine parts was not a problem. The bond of cotton to applicator stick was not very good when the swabs were just produced and still moist. However, when the swabs were tested twenty-four hours later, the bond had improved. Testing of the swabs several days later showed a bond strength between the cotton and polypropylene applicator stick of 7.6 kg.

Adhesive 5, which yielded the substantially best overall results, ran very well on the machine, had good swabs with no bare ends. No problems were encountered in cleaning the glue pot and machine parts. The bond of cotton to applicator several days later gave a bond strength of 9.0 kg.

Adhesive 6 ran well on the machine to produce swabs but did not machine well in the glue pot. It also set up very quickly on the glue wheels. The adhesive had good initial tack and good swabs, with no bare ends, were produced. The cleaning of the glue pot and the machine parts was not a problem. The bond of cotton to applicator stick tested several days later was 9.1 kg.

The foregoing illustrate certain preferred embodiments of the present invention, but should not be construed in a limiting sense. The scope of protection that is sought is set forth in the claims which follow.

I claim:

1. An aqueous adhesive composition having good adhesion to a non-polar polymeric surface and to cellulosic materials which comprises an aqueous dispersion of:
    (a) a N-vinyl lactam polymeric resin adhesive;
    (b) a tackifier for (such) said adhesive; and
    (c) an (effective) emulsion stabilizing amount of an ethylene/vinyl acetate copolymer emulsion stabilizer for the adhesive (a) and tackifier (b).

2. A composition as claimed in claim 1 wherein (a) is present at from about 10% to about 30% by weight of the composition, (b) is present at from about 10% to about 30% by weight of the composition, and (c) is present at from about 15% to about 30% by weight.

3. A composition as claimed in claim 1 wherein resin (a) is a copolymer of vinyl pyrrolidone and an ethylenically unsaturated monomer.

4. A composition as claimed in claim 3 wherein the monomer is vinyl acetate.

5. A composition as claimed in claim 1 wherein the tackifier (b) is a rosin ester tackifier.

6. A composition as claimed in claim 1 which comprises from about 10% to about 30%, by weight, of a copolymer of vinyl pyrrolidone and an ethylenically unsaturated monomer, from about 10% to about 30%, by weight, of rosin ester tackifier, and from about 15% to about 30%, by weight, of ethylene/vinyl acetate copolymer.

7. A composition as claimed in claim 6 which comprises an aqueous/alcohol dispersion medium in an amount of from about 25% to about 60%, by weight, with the remainder being the adhesive agent dispersed therein.

* * * * *